United States Patent
Bamidi et al.

(10) Patent No.: US 10,666,624 B2
(45) Date of Patent: May 26, 2020

(54) SYSTEMS AND METHODS FOR OPTIMIZED NETWORK LAYER MESSAGE PROCESSING

(71) Applicant: QUALCOMM Incorporated, San Diego, CA (US)

(72) Inventors: Ravi Kiran Bamidi, Bangalore (IN); Chirag Manojkumar Kharvar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 15/835,943

(22) Filed: Dec. 8, 2017

(65) Prior Publication Data

US 2019/0068559 A1    Feb. 28, 2019

(30) Foreign Application Priority Data

Aug. 23, 2017    (IN) .............................. 201741029838

(51) Int. Cl.
| | |
|---|---|
| H04L 29/06 | (2006.01) |
| H04L 9/32 | (2006.01) |
| H04L 12/741 | (2013.01) |
| H04W 12/02 | (2009.01) |
| H04W 12/00 | (2009.01) |
| H04W 12/04 | (2009.01) |
| H04W 84/18 | (2009.01) |

(52) U.S. Cl.
CPC ........ *H04L 63/0428* (2013.01); *H04L 9/3242* (2013.01); *H04L 45/74* (2013.01); *H04L 63/12* (2013.01); *H04W 12/02* (2013.01); *H04L 63/0414* (2013.01); *H04L 63/0435* (2013.01); *H04L 63/126* (2013.01); *H04W 12/001* (2019.01); *H04W 12/04* (2013.01); *H04W 84/18* (2013.01)

(58) Field of Classification Search
CPC ... H04L 63/0428; H04L 9/3242; H04L 45/74; H04L 63/12; H04W 12/02; H04W 12/04; H04W 84/18
See application file for complete search history.

(56) References Cited

U.S. PATENT DOCUMENTS

| | | | | |
|---|---|---|---|---|
| 7,079,537 B1* | 7/2006 | Kanuri | ................... | H04L 49/602 370/392 |
| 7,441,043 B1* | 10/2008 | Henry | ................. | H04L 29/1233 709/238 |
| 8,924,705 B1* | 12/2014 | Markov | .............. | H04L 63/0435 713/150 |
| 2003/0079144 A1* | 4/2003 | Kakemizu | ............... | H04L 67/42 726/29 |
| 2007/0083923 A1* | 4/2007 | Fluhrer | ............... | H04L 63/1466 726/12 |

(Continued)

OTHER PUBLICATIONS

International Search Report and Written Opinion—PCT/US2018/042459—ISA/EPO—dated Sep. 19, 2018.

*Primary Examiner* — Ghodrat Jamshidi
(74) *Attorney, Agent, or Firm* — Austin Rapp

(57) ABSTRACT

A method by a mesh device is described. The method includes de-obfuscating first information of a received packet with a privacy key that matches a network identifier (NID) of the packet. The method also includes determining whether to decrypt second information of the packet based on the de-obfuscated first information.

22 Claims, 7 Drawing Sheets

(56) References Cited

U.S. PATENT DOCUMENTS

| | | | |
|---|---|---|---|
| 2009/0178104 A1* | 7/2009 | Shah | H04L 63/0485 |
| | | | 726/1 |
| 2011/0103394 A1* | 5/2011 | Vogt | H04L 29/12367 |
| | | | 370/401 |
| 2014/0201527 A1* | 7/2014 | Krivorot | G06F 21/6209 |
| | | | 713/168 |
| 2014/0378057 A1* | 12/2014 | Ramon | H04L 9/32 |
| | | | 455/41.2 |
| 2015/0195710 A1 | 7/2015 | Bar-Niv et al. | |
| 2015/0245412 A1* | 8/2015 | Tyson | H04L 43/065 |
| | | | 370/338 |
| 2016/0165387 A1 | 6/2016 | Nhu | |
| 2016/0165649 A1 | 6/2016 | Polo et al. | |
| 2016/0248682 A1 | 8/2016 | Lee et al. | |
| 2016/0255054 A1* | 9/2016 | Wan | H04L 63/0414 |
| | | | 713/160 |
| 2017/0142086 A1 | 5/2017 | Chen et al. | |
| 2017/0155512 A1 | 6/2017 | Ogura et al. | |
| 2017/0171071 A1 | 6/2017 | Turon | |
| 2018/0054825 A1* | 2/2018 | Kourzanov | H04W 72/0466 |
| 2018/0351970 A1* | 12/2018 | Majumder | H04L 63/1408 |

\* cited by examiner

SYSTEMS AND METHODS FOR OPTIMIZED NETWORK LAYER MESSAGE PROCESSING

RELATED APPLICATIONS

This application is related to and claims priority from Indian Provisional Patent Application No. 201741029838, filed Aug. 23, 2017, for "SYSTEMS AND METHODS FOR OPTIMIZED NETWORK LAYER MESSAGE PROCESSING."

TECHNICAL FIELD

The present disclosure relates generally to wireless communications. More specifically, the present disclosure relates to systems and methods for optimized network layer message processing.

BACKGROUND

In the last several decades, the use of wireless communication devices has become common. In particular, advances in electronic technology have reduced the cost of increasingly complex and useful wireless communication devices. Cost reduction and consumer demand have proliferated the use of wireless communication devices such that they are practically ubiquitous in modern society. As the use of wireless communication devices has expanded, so has the demand for new and improved features of wireless communication devices. More specifically, wireless communication devices that perform new functions and/or that perform functions faster, more efficiently or more reliably are often sought after.

Advances in technology have resulted in smaller and more powerful wireless communication devices. For example, there currently exists a variety of wireless communication devices such as portable wireless telephones (e.g., smartphones), personal digital assistants (PDAs), laptop computers, tablet computers and paging devices that are each small, lightweight and can be easily carried by users.

A wireless communication device may make use of one or more wireless communication technologies. For example, a wireless communication device may communicate using Bluetooth technology or other wireless technology. In some cases, a wireless communication device may be a node in a mesh network. Currently, a packet received by a mesh device in a mesh network must be de-obfuscated and decrypted before being authenticated against a network key. However, network layer message processing may be optimized by determining whether to perform decrypted authentication based on de-obfuscated information from the packet.

SUMMARY

A method by a mesh device is described. The method includes de-obfuscating first information of a received packet with a privacy key that matches a network identifier (NID) of the packet. The method also includes determining whether to decrypt second information of the packet based on the de-obfuscated first information.

The packet may be a Bluetooth Low Energy mesh packet. The first information may include at least one of a sequence number (SEQ) and/or a source (SRC) address. The second information may include destination (DST) information and a payload.

Determining whether to decrypt the second information may include determining that the SRC address of the packet is valid. Determining that the SRC address of the packet is valid may include determining that the SRC address is not an unassigned, group or virtual address. Determining that the SRC address of the packet is valid may include determining that the SRC address does not belong to the mesh device. If the SRC address is invalid, then the method may further include determining whether the SRC address of the packet is valid using all known networks with an NID that matches the NID of the packet. If the SRC address is invalid, then the packet may be discarded without decrypting the second information.

If the SRC address is valid, then determining whether to decrypt the second information may further include determining whether a SEQ and the SRC address of the packet are already present in a network message cache. If the SEQ and SRC address of the packet are already present in the network message cache, then the packet may be discarded without decrypting the second information. If the SEQ and SRC address of the packet are not present in the network message cache, then the second information may be decrypted.

A mesh device is also described. The mesh device includes a processor, a memory in communication with the processor and instructions stored in the memory. The instructions are executable by the processor to de-obfuscate first information of a received packet with a privacy key that matches an NID of the packet. The instructions are also executable to determine whether to decrypt second information of the packet based on the de-obfuscated first information.

A non-transitory tangible computer readable medium storing computer executable code is also described. The computer readable medium includes code for causing a mesh device to de-obfuscate first information of a received packet with a privacy key that matches an NID of the packet. The computer readable medium also includes code for causing the mesh device to determine whether to decrypt second information of the packet based on the de-obfuscated first information.

An apparatus is also described. The apparatus includes means for de-obfuscating first information of a received packet with a privacy key that matches an NID of the packet. The apparatus also includes means for determining whether to decrypt second information of the packet based on the de-obfuscated first information.

DETAILED DESCRIPTION

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
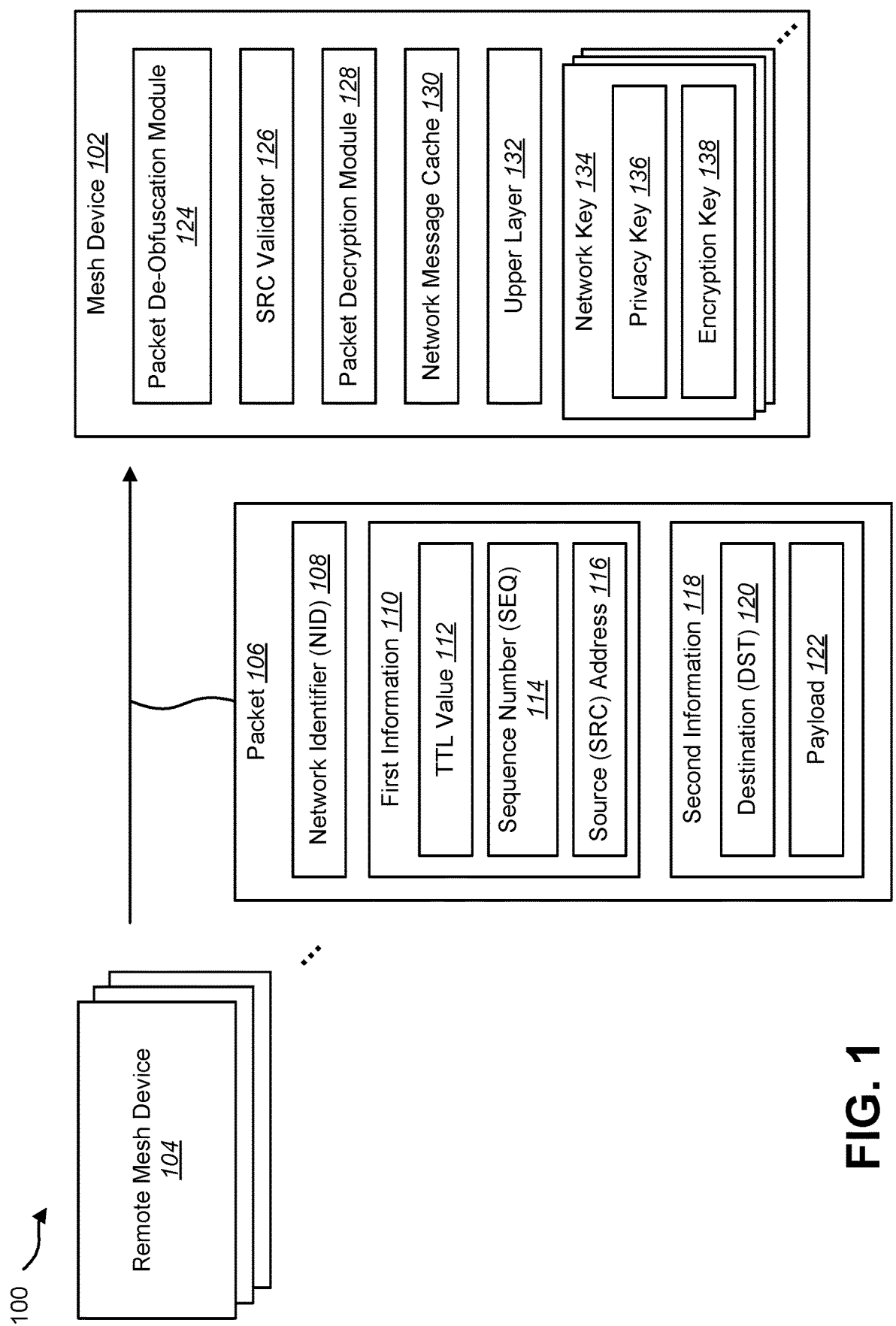
FIG. 1 is a block diagram illustrating one configuration of a wireless communication system in which optimized network layer message processing may be implemented.

FIG. 1 is a block diagram illustrating one configuration of a wireless communication system in which optimized network layer message processing may be implemented. The wireless communication system may include a mesh device 102 and one or more remote mesh devices 104. Wireless communication systems are widely deployed to provide various types of communication content such as voice, data, and so on.

Some wireless communication devices may utilize multiple communication technologies. For example, one communication technology may be utilized for mobile wireless system (MWS) (e.g., cellular) communications, while another communication technology may be utilized for wireless connectivity (WCN) communications. MWS may refer to larger wireless networks (e.g., wireless wide area networks (WWANs), cellular phone networks, Long Term Evolution (LTE) networks, Global System for Mobile Communications (GSM) networks, code division multiple access (CDMA) networks, CDMA2000 networks, wideband CDMA (W-CDMA) networks, Universal mobile Telecommunications System (UMTS) networks, Worldwide Interoperability for Microwave Access (WiMAX) networks, etc.). WCN may refer to relatively smaller wireless networks (e.g., wireless local area networks (WLANs), wireless personal area networks (WPANs), Institute of Electrical and Electronics Engineers (IEEE) 802.11 (Wi-Fi) networks, Bluetooth (BT) networks, wireless Universal Serial Bus (USB) networks, etc.).

Communications in a wireless communication system (e.g., a multiple-access system) may be achieved through transmissions over a wireless link. Such a wireless link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

A mesh device 102 is an electrical device that may be configured to communicate using Bluetooth mesh protocols or other mesh protocols. A mesh device 102 may also be referred to as a wireless communication device, a wireless device, a mobile device, mobile station, subscriber station, client, client station, user equipment (UE), remote station, access terminal, mobile terminal, terminal, user terminal, subscriber unit, etc. Examples of mesh devices 102 include laptop or desktop computers, cellular phones, smartphones, wireless modems, e-readers, tablet devices, gaming systems, keyboards, keypads, computer mice, remote controllers, headsets, headphones, wireless speakers, sensors, routers, meters, internet of things (IoT) devices, medical devices, etc.

In an implementation, the mesh device 102 may communicate using the Bluetooth protocol. A Bluetooth device may be configured to establish links with one or more target devices that have Bluetooth transceivers. Bluetooth is a packet-based protocol with a master-slave structure. Bluetooth operates in the Industrial, Scientific and Medical (ISM) 2.4 GHz short-range radio frequency band (e.g., 2400-2483.5 MHz). Bluetooth uses a radio technology called frequency-hopping spread spectrum in which transmitted data is divided into packets 106 and each packet 106 is transmitted on a designated Bluetooth frequency (e.g., channel).

Communications in a Bluetooth network may be achieved based on a master polled system. The master polled system may utilize time-division duplexing (TDD) in which a Bluetooth device may send a packet 106 to a target device. For example, a remote Bluetooth device may send a packet 106 to the Bluetooth device during pairing or during a connection request. In one implementation, the Bluetooth device may be a master device and the target Bluetooth device may be a slave device. In a master polled system, the Bluetooth device sending the packet 106 gives the slave wireless device the ability to transmit back.

The Bluetooth wireless communication standard is typically employed for exchanging communications between fixed or mobile Bluetooth-enabled devices over short distances. In some configurations, the systems and methods disclosed herein may be applied to Bluetooth Low Energy (BLE) devices. LE refers to the "Low Energy" extension of the Bluetooth standard. The BLE extension is focused on energy-constrained applications such as battery-operated devices, sensor applications, etc. The BLE extension may also be referred to as Bluetooth Smart.

The following description uses terminology associated with the Bluetooth and Bluetooth LE standards. Nevertheless, the concepts may be applicable to other technologies and standards that involve modulating and transmitting digital data. Accordingly, while some of the description is provided in terms of Bluetooth standards, the systems and methods disclosed herein may be implemented more generally in wireless communication devices that may not conform to Bluetooth standards.

It should be noted that the Bluetooth Mesh protocol can be used on non-Bluetooth devices (e.g., a WiFi-Bluetooth Gateway). These non-Bluetooth devices may implement Mesh to receive a packet 106 (e.g., a network protocol data unit (PDU)) remotely over the Transmission Control Protocol (TCP) and/or User Datagram Protocol (UDP) and then may send the packet 106 over BLE.

A mesh network 100 may include multiple nodes. In an implementation, the nodes may be referred to as internet of things (IoT) devices, IOT nodes or mesh nodes, depending on the technology underneath it. A mesh network 100 may also be referred to as an IoT network. In one approach, a mesh network 100 may use Bluetooth Low Energy as the underlying radio technology to communicate between devices.

In a Bluetooth Mesh Profile network, a transmitting Bluetooth device may send a packet 106 (also referred to as a network PDU) to a receiving Bluetooth device. The Bluetooth mesh networking specifications define requirements to enable an interoperable mesh networking for BLE wireless technology. An example of a network PDU in accordance with the Bluetooth Mesh Profile is described in connection with FIG. 4.

In BLE mesh terminology, a transmitting or receiving mesh device 102 may be referred to as a mesh bearer. A bearer is the protocol over which a mesh network PDU is transmitted or received. For example, BLE Advertisements, BLE Generic Attributes (GATT) Connection, TCP/UDP, etc. may be transmitted or received by a mesh bearer.

In the case of network layer message reception, the Bluetooth Mesh Profile specifications state that the received packet 106 needs to be de-obfuscated, decrypted and authenticated against a network key 134. The specified method for network layer message reception in the Bluetooth Mesh Profile specification is described in connection with FIG. 5.

Network keys 134 may be distributed in different ways. In a first approach, a mesh device 102 may be provisioned with one or more network keys 134. The process of authenticating and providing basic information (e.g., a unicast address and a network key 134) to a mesh device 102 is referred to as provision or provisioning. A mesh device 102 must be provisioned with a network key 134 to become a node in the mesh network 100. Once provisioned, a node can transmit or receive messages in a mesh network 100. A network key 134 may be used to secure and authenticate messages at the network layer.

A second approach for providing a network key 134 to the mesh device 102 is over a configuration model (once the mesh device 102 is provisioned with a network key 134). For example, the mesh device 102 may be configured with one or more additional network keys 134 using a first network key 134.

A packet 106 includes a network identifier (NID) field 108. The NID field 108 may contain a 7-bit network identifier that allows for lookup of a privacy key 136 and an encryption key 138 used to authenticate and encrypt the packet 106. In some implementations, the NID 108 may be transmitted in clear text.

The mesh device 102 may have knowledge of multiple network keys 134. The NID 108 may be derived from a network key 134 such that each network key 134 generates one network ID 108. However, it should be noted that multiple networks can have the same NID 108. The NID value 108 may be derived from the network key 134 in conjunction with the privacy key 136 and the encryption key 138. The encryption key 138 may be derived from the network key 134. The privacy key 136 may also be derived using a key derivation function from the network key 134 to protect the network key 134 even if the privacy key 136 is compromised.

The privacy key 136 is used to obfuscate and de-obfuscate information (i.e., first information 110) in the packet 106. Obfuscation is a process applied to information to intentionally make the information difficult to reverse without knowing the algorithm that was applied. De-obfuscation is the process of transforming obfuscated information back to its original, un-obfuscated form. De-obfuscation may be performed using the privacy key 136 that was used to obfuscate the information.

In some implementations, obfuscation may be used as a privacy mechanism that utilizes Advanced Encryption Standard (AES) to encode the source (SRC) address 116, sequence numbers (SEQ) 114, and other header information (e.g., Network control message indication (CTL), time to live (TTL) value 112) using the privacy key 136. The intent for obfuscation is to make tracking nodes more difficult. However, it should be noted that obfuscation does not require a secret (e.g., encryption key 138) to understand the data.

On the other hand, the encryption key 138 may be used to encrypt and decrypt information (i.e., second information 118) in the packet 106. Encrypted information is more secure than obfuscated information. The encrypted information may only be decrypted using the secret encryption key 138. However, the process of decrypting information may require more computing resources than de-obfuscating information.

According to the Bluetooth Mesh Profile specification, information in a received packet 106 is both de-obfuscated and decrypted before determining whether to accept or discard the packet 106. For example, in reference to FIG. 5, in step 508 ("A NetKey verifies message integrity check (MIC)"), the mesh device 102 must de-obfuscate the CTL, TTL 112, SEQ 114 and/or SRC 116 using AES-Electronic CodeBook (ECB) with the privacy key 136. This step also includes the mesh device 102 using a decrypted authentication of the destination (DST) 120 and/or payload 122 using AES-CCM with the encryption key 138.

Since multiple networks can have the same NID 108, there is a need to identify the correct network key 134. In other words, when a mesh device 102 receives a packet 106, the NID 108 may be the same for multiple known networks. In this case, the mesh device 102 may not know which network key 134 (and thus privacy key 136 and encryption key 138) should be used to process (e.g., de-obfuscate and/or decrypt) the packet 106.

As per the specification, the SRC address 116 should be a unicast address, where the most significant bit is "0." When a mesh device 102 de-obfuscates a packet 106 with a wrong privacy key 136 (i.e., as a result of using the wrong network key 134), there is a 50 percent chance that the most significant bit (MSB) of the SRC address 116 can be "1" (which indicates a group or virtual address) or "0" (which indicates a unicast address). When the SRC address 116 has MSB set to "1," this indicates that the packet 106 is an invalid packet and cannot be used for further processing. However, according to the Mesh Profile specification, even though the mesh device 102 is aware of this after de-obfuscating, the mesh device 102 proceeds further with decryption and authentication before dropping the packet 106.

In the case of a valid packet 106 with an SRC address 116 that is a unicast address, after successful authentication against a known network, the mesh device 102 may check whether the packet 106 has already been processed earlier by comparing it with the contents of a network message cache 130. As per the specification, the sequence number (SEQ) 114 is unique to an element (SRC 116). Every new network layer packet 106 will have a new SEQ 114. Since SEQ 114 and SRC 116 are available after de-obfuscation of the packet 106, it is unnecessary to decrypt the entire packet 106 if SEQ 114 and/or SRC 116 already exist in the network message cache 130.

In the above scenarios, redundant decryption of packets 106 leads to unnecessary processing. This processing wastes power, as well as delays new packet processing. Benefits may be realized by determining whether to decrypt information of the packet 106 based on the de-obfuscated information.

The mesh device 102 may include a packet de-obfuscation module 124. The packet de-obfuscation module 124 may de-obfuscate first information 110 of a received packet 106 using a first privacy key 136 that matches the network identifier (NID) 108 of the packet 106. The obfuscated first information 110 may include a TTL value 112, the SEQ 114 and the SRC 116 of the packet 106.

The mesh device 102 may be provisioned or configured with multiple network keys 134 that match the NID 108 of the packet 106. The mesh device 102 may select a network key 134 from among the plurality of provisioned/configured network keys 134. The mesh device 102 may obtain the first privacy key 136 using the selected network key 134. The packet de-obfuscation module 124 may de-obfuscate the first information 110 of the packet 106 (e.g., TTL value 112, SEQ 114 and SRC 116) using the first privacy key 136.

The mesh device 102 may also include an SRC validator 126. The SRC validator 126 may check if the SRC address 116 is valid. In one approach, the SRC validator 126 may determine whether the SRC address 116 is not an unassigned, group or virtual address. In the case of an unassigned address, the SRC address 116 may have a NULL value (e.g., all bits of the SRC 116 field are 0). In the case of a group or virtual address, the SRC validator 126 may determine whether the MSB of the SRC address 116 is 1 (which indicates a group or virtual address). Therefore, if the SRC address 116 is all zeroes or if the MSB of the SRC 116 is 1, then the SRC 116 is invalid.

The SRC validator 126 may also determine whether the packet 106 originated from the mesh device 102. For example, a packet 106 may be sent by a node in a mesh network 100, but the same node may then receive the packet 106 as a relayed message from a remote mesh device 104. In this case, the SRC address 116 of the packet 106 would belong to the mesh device 102. Therefore, the SRC validator 126 may determine that the SRC address 116 is valid if the SRC address 116 is not one of the mesh device's 102 own element addresses.

If the SRC address 116 is invalid, the mesh device 102 may try de-obfuscating the first information 110 with the next network key 134 with a matching NID 108. For example, the mesh device 102 may select a second network key 134 that matches the NID 108 from the known network keys 134. The mesh device 102 may then de-obfuscate the first information 110 using a second privacy key 136 associated with the second network key 134. The mesh device 102 may then attempt to validate the SRC address 116 as described above.

The mesh device 102 may repeat this process of selecting matching network keys 134 until a SRC address 116 is validated or all matching network keys 134 have been used. If no valid SRC address 116 is obtained using the known network keys 134, then the mesh device 102 may discard the packet 106 without decrypting the second information 118, which saves processing time and energy.

If the SRC address 116 is valid, then the mesh device 102 may check if the SEQ 114 and/or SRC address 116 is already present in the network message cache 130. For example, if the mesh device 102 has already received the packet 106, the mesh device 102 may save the packet 106 in the network message cache 130. The mesh device 102 may check if the SRC address 116 is in the network message cache 130. If so, the mesh device 102 may check to determine whether the SEQ 114 indicates that the packet 106 is new. In other words, if the SEQ 114 of the received packet 106 is the same as or less than the SEQ 114 of a cached packet 106, then the cached packet 106 is already present in the network message cache 130. In this case, the mesh device 102 may discard the received packet 106 without decrypting the second information 118.

If the received packet 106 is not present in the network message cache 130, then the mesh device 102 may proceed to decrypt and authenticate the packet 106. The mesh device 102 may include a packet decryption module 128 that decrypts the second information 118 (e.g., DST 120 and/or payload 122) of the packet 106.

Upon decrypting the second information 118, the mesh device 102 may determine whether the destination (DST) 120 is valid. The DST 120 field may be a 16-bit value that identifies the element or elements that a packet 106 is directed towards. The DST 120 address may be a unicast address, a group address, or a virtual address. The DST 120 field may be set by the originating node and is untouched by the network layer in nodes operating as a relay node. The mesh device 102 may determine whether the DST 120 is a valid unicast address, group address, or virtual address. If the DST 120 is invalid, the mesh device 102 may discard the received packet 106.

If the DST 120 is valid, then the mesh device 102 may add the received packet 106 to the network message cache 130. The mesh device 102 may forward the received packet 106 to the upper layer 132 for additional processing.

The systems and methods described herein provide advantages over existing approaches for network layer message processing. When processing with the wrong network (e.g., network key 134) with a matching NID 108, for 50% of the packets 106, decrypted authentication can be avoided by validating the SRC address 116 right after de-obfuscation. For all repeated or relayed packets 106, decrypted authentication can be avoided by comparing the SEQ 114 and/or SRC address 116 of a packet 106 with the contents of network message cache 130 right after de-obfuscation. This results in power savings and improved processing speed.

Figure 2:
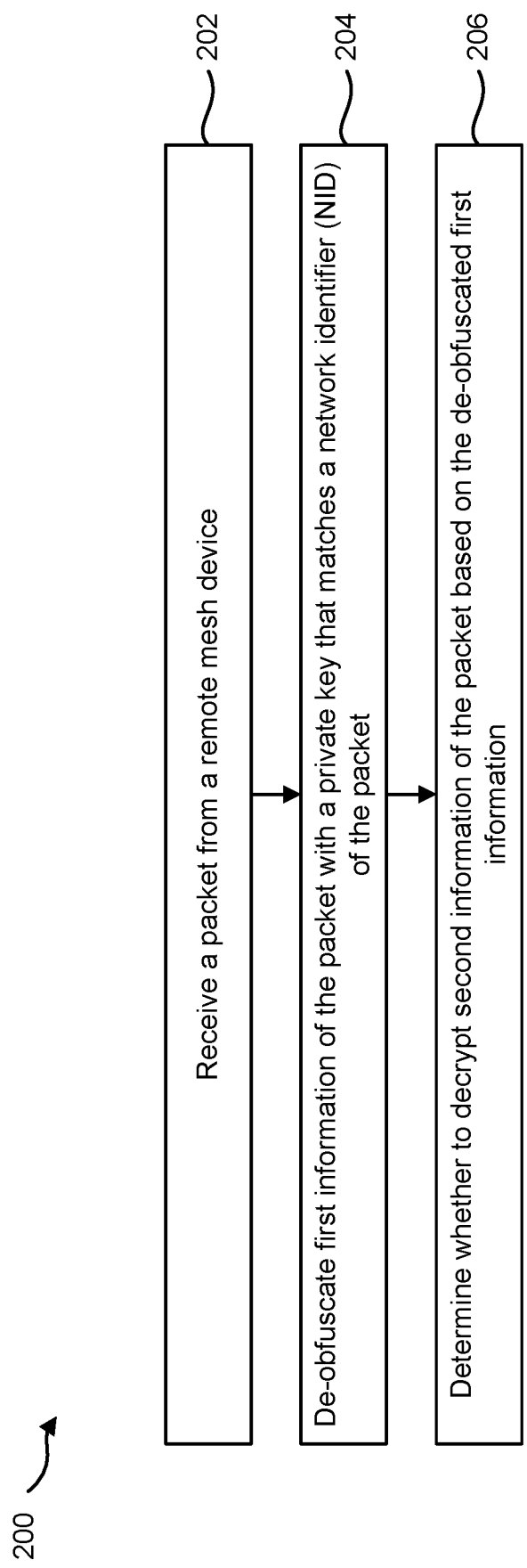
FIG. 2 is a flow diagram illustrating a method for optimized network layer message processing.

FIG. 2 is a flow diagram illustrating a method 200 for optimized network layer message processing. This method 200 may be implemented by a mesh device 102 that is connected to one or more remote mesh devices 104 in a mesh network 100.

The mesh device 102 may receive 202 a packet 106 from a remote mesh device 104. The packet 106 may be a Bluetooth Low Energy mesh packet.

The mesh device 102 may de-obfuscate 204 first information 110 of the received packet 106 with a privacy key 136 that matches a network identifier (NID) 108 of the packet 106. For example, the mesh device 102 may select a known network key 134 that matches the NID 108 of the packet 106. In some implementations, the mesh device 102 may de-obfuscate 204 the first information 110 using AES-ECB with the privacy key 136 associated with the selected network key 134. The first information 110 of the packet 106 may include at least one of a sequence number (SEQ) 114 and/or a source (SRC) address 116.

The mesh device 102 may determine 206 whether to decrypt second information 118 of the packet 106 based on the de-obfuscated first information 110. The second information 118 may include destination (DST) 120 information and a payload 122 of the packet 106.

Determining whether to decrypt the second information 118 may include determining that the SRC address 116 of the packet 106 is valid. The mesh device 102 may determine that the SRC address 116 is valid by determining that the SRC address 116 is not an unassigned, group or virtual address. The mesh device 102 may also determine that the SRC address 116 is valid by determining that the SRC address 116 does not belong to the mesh device 102 (e.g., the packet 106 was not relayed back to the mesh device 102).

If the mesh device 102 determines that either the SRC address 116 is invalid, the mesh device 102 may select a second privacy key 136 that matches the NID 108 of the packet 106. The mesh device 102 may then de-obfuscate the first information 110 of the received packet 106 with the second privacy key 136 to determine whether the SRC address 116 is valid. After using all known network keys 134 that match the NID 108 of the packet 106, if the SRC address 116 is invalid, then the packet 106 is discarded without decrypting the second information 118.

If the SRC address 116 is valid, then the mesh device 102 may determine whether the SEQ 114 and SRC address 116 of the packet 106 are already present in a network message cache 130. If the SEQ 114 and SRC address 116 of the packet 106 are already present in the network message cache 130, then the packet 106 may be discarded without decrypting the second information 118. If the SEQ 114 and SRC address 116 of the packet 106 are not present in the network message cache 130, then the second information 118 is decrypted.

Figure 3:
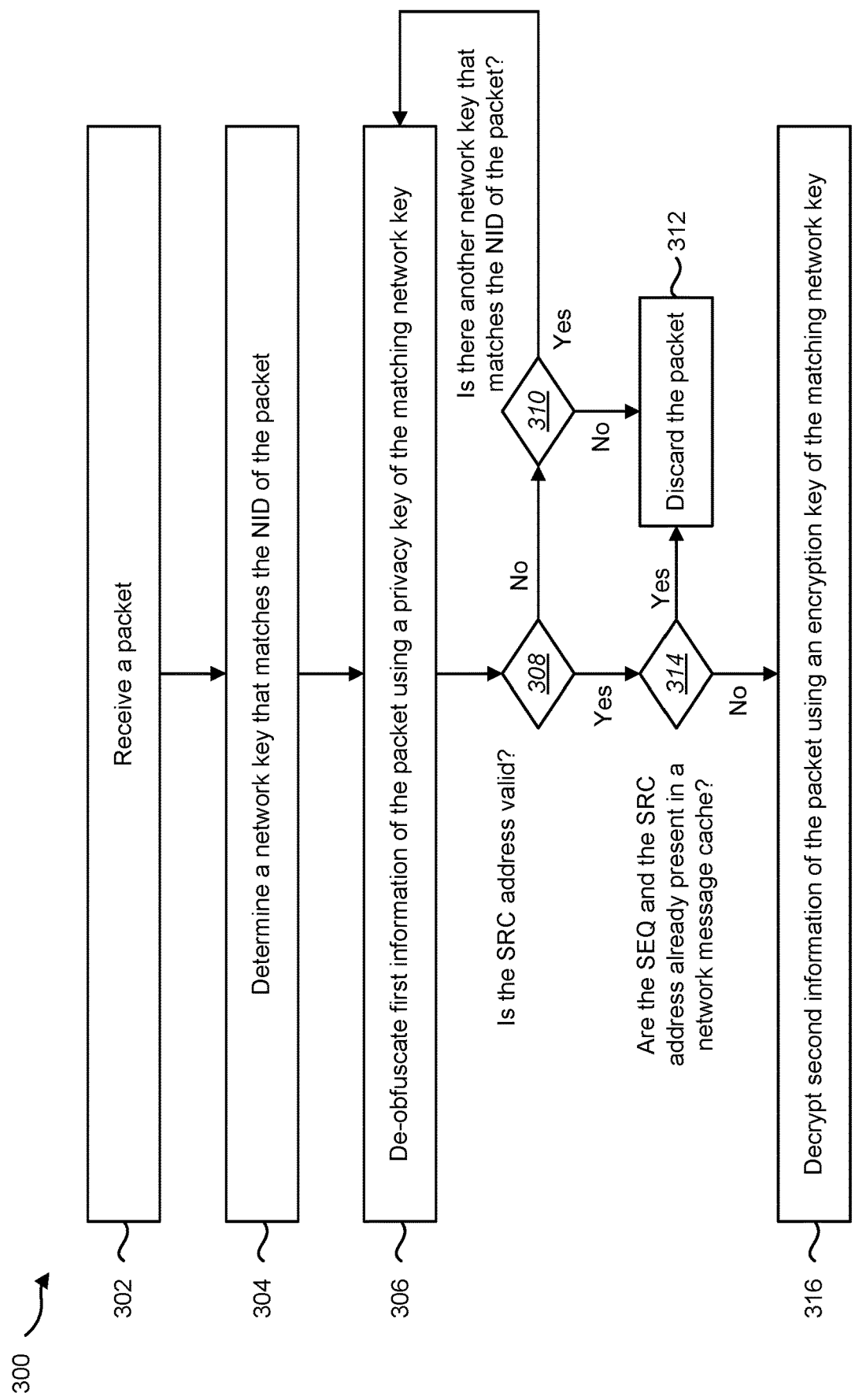
FIG. 3 is a flow diagram illustrating another method for optimized network layer message processing.

FIG. 3 is a flow diagram illustrating another method 300 for optimized network layer message processing. This method 300 may be implemented by a mesh device 102 that is connected to one or more remote mesh devices 104 in a mesh network 100.

The mesh device 102 may receive 302 a packet 106. The packet 106 may be received from a remote mesh device 104. The packet 106 may be a Bluetooth Low Energy mesh packet. For example, the packet 106 may be a network PDU.

The mesh device 102 may determine 304 a network key 134 that matches the NID of the packet 106. The mesh device 102 may have knowledge of multiple network keys 134. For example, the mesh device 102 may be provisioned or configured with multiple network keys 134. A network key 134 may be associated with a given NID 108. The mesh device 102 may determine the NID 108 from the packet 106. Using the packet NID 108, the mesh device 102 may select a network key 134 that matches the NID 108.

The mesh device 102 may de-obfuscate 306 first information 110 of the received packet 106 with a first privacy key 136 of the matching network key 134. For example, the mesh device 102 may derive the privacy key 136 using the matching network key 134. In an implementation, the mesh device 102 may de-obfuscate 306 the first information 110 using AES-ECB with the privacy key 136 associated with the selected network key 134. The first information 110 of the packet 106 may include at least one of a sequence number (SEQ) 114 and/or a source (SRC) address 116.

The mesh device 102 may determine 308 whether the SRC address 116 is valid. For example, the mesh device 102 may determine that the SRC address 116 is valid by determining that the SRC address 116 is not an unassigned, group or virtual address. The mesh device 102 may also determine that the SRC address 116 is valid by determining that the SRC address 116 does not belong to the mesh device 102 (e.g., the packet 106 was not relayed back to the mesh device 102).

If the SRC address 116 is not valid, then the mesh device 102 may determine 310 whether there is another network key 134 that matches the NID 108 of the packet 106. If the mesh device 102 selects the incorrect network key 134 for the packet 106, the de-obfuscation process may result in an invalid SRC address 116. In this case, the mesh device 102 may select another network key 134 that matches the NID 108 of the packet 106 and repeat de-obfuscating 306 the first information 110 of the received packet 106 with the privacy key 136 of the new matching network key 134.

The mesh device 102 may attempt to de-obfuscate 306 first information 110 of the received packet 106 using the privacy key 136 for each known network key 134 matching the NID 108. If no valid SRC address 116 is obtained and the mesh device 102 determines 310 that there are no additional network keys 134 matching the NID 108 of the packet 106, then the mesh device 102 may discard 312 the packet 106 without decrypting the second information 118.

If the mesh device 102 determines 308 that the SRC address 116 is valid, then the mesh device 102 may determine 314 whether the SEQ 114 and SRC address 116 of the packet 106 are already present in a network message cache 130. If the SEQ 114 and SRC address 116 of the packet 106 are already present in the network message cache 130, then the packet 106 may be discarded 312 without decrypting the second information 118.

If mesh device 102 determines 314 that the SEQ 114 and SRC address 116 of the packet 106 are not present in the network message cache 130, then the mesh device 102 may decrypt 316 the second information 118 (e.g., DST 120 and/or payload 122) using an encryption key 138 of the matching network key 134. For example, the mesh device 102 may derive the encryption key 138 using the matching network key 134. The second information 118 may then be decrypted using the encryption key 138.

Figure 4:
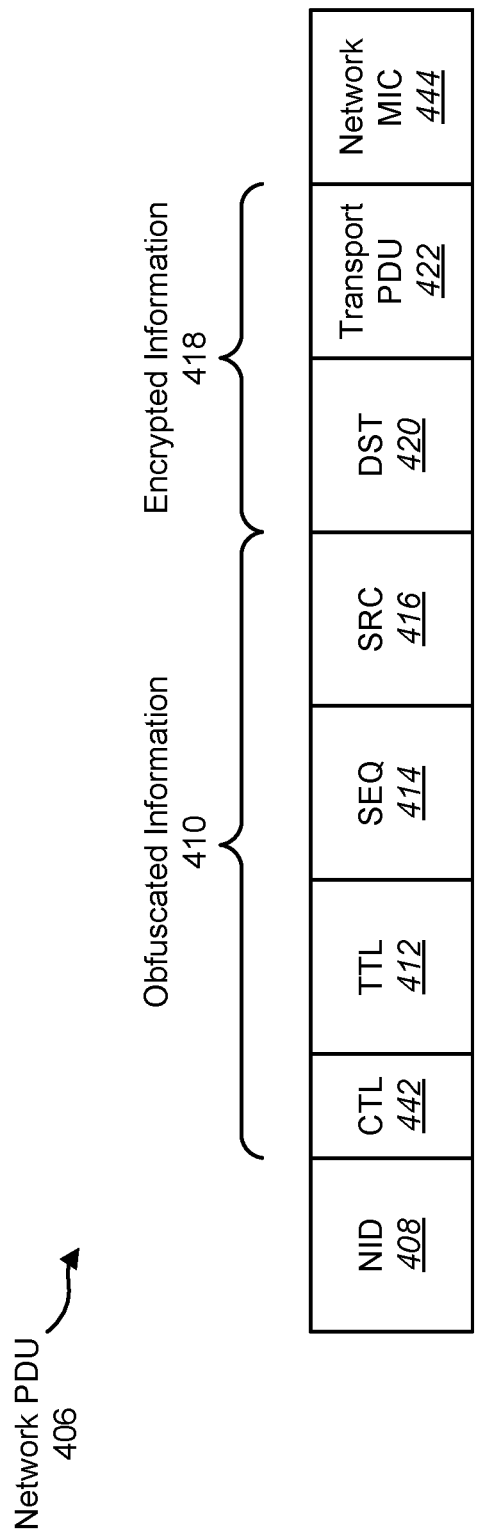
FIG. 4 illustrates an example of a mesh network protocol data unit (PDU)

FIG. 4 illustrates an example of a mesh network protocol data unit (PDU) 406. The network PDU 406 may be an implementation of the packet 106 described in connection with FIG. 1. In particular, the network PDU 406 may be implemented according to the Bluetooth Mesh Profile specification.

The network PDU 406 may include a number of fields. The NID field 408 may contain a 7-bit network identifier that allows for an easier lookup of the encryption key 138 and privacy key 136 used to authenticate and encrypt this network PDU 406. The NID value may be derived from the network key 134 in conjunction with the encryption key 138 and privacy key 136.

The network PDU 406 may also include a CTL 442. The CTL 442 may be a network control message indication. The CTL field may be a 1-bit value that is used to determine if the network PDU 406 is part of a control message or an access message.

The network PDU 406 may also include a time to live (TTL) field 412. The use of the TTL value of zero allows a node to transmit a network PDU 406 that it knows will not be relayed, and therefore the receiving node can determine that the sending node is a single radio link away. The use of a TTL value of one or larger cannot be used for such a determination.

The network PDU 406 may also include a SEQ 414. The SEQ field may be a 24-bit integer. The SEQ 414 may be a unique value for each new network PDU 406 originated by a given node.

The network PDU 406 may also include an SRC 416 (also referred to as an SRC address). The SRC field may be a 16-bit value that identifies the element (e.g., mesh device) that originated this network PDU 406. The SRC 416 address may be a unicast address. The SRC field may be set by the originating element and untouched by nodes operating as a relay node.

The network PDU 406 may also include a DST 420. The DST field may be a 16-bit value that identifies the element or elements that this network PDU 406 is directed towards. This address may be a unicast address, a group address, or a virtual address. The DST field may be set by the originating node and is untouched by the network layer in nodes operating as a relay node.

The network PDU 406 may also include a transport PDU 422. The transport PDU field, from a network layer point of view, is a sequence of octets of data. The transport PDU 422 may be an implementation of the payload 122 described in connection with FIG. 1.

The network PDU 406 may also include a network Message Integrity Check (MIC) (e.g., NetMIC) 444. The NetMIC field may be a 32-bit or 64-bit field (depending on the value of the CTL bit) that authenticates that the DST 420 and the transport PDU 422 have not been changed.

Network PDUs 406 are secured using keys derived from a single network key 134, as identified by the NID field 408. However, the same NID value may refer to multiple networks. The CTL 442, TTL 412, SEQ 414 and SRC 416 may be obfuscated information 410. The network layer may obfuscate and de-obfuscate the obfuscated information 410 with a privacy key 136. The DST 420 and the transport PDU 422 may be encrypted information 418. The network layer may encrypt and decrypt the encrypted information 418 with an encryption key 138.

The network layer of a mesh device may encrypt the DST 420 and the transport PDU 422 of the network PDU 406 using the sequence number for that Network PDU. The network layer may then obfuscate the CTL 442, TTL 412, SEQ 414 and SRC 416 so that only the NID 408 is visible in clear text. Obfuscation may be used to hide possible identifying information from the network PDU 406.

In order to obfuscate the network header (e.g., CTL 442, TTL 412, SEQ 414 and SRC 416), these values may be combined with a result of a single encryption function, designed to prevent a passive eavesdropper from determining the identity of a node by listening to network PDUs 406. The obfuscation may be calculated using information available from within the network PDU 406. This obfuscation is designed to help prevent a simple passive eavesdropper from tracking nodes. A determined attacker may still discover patterns within this obfuscation that can lead to the revealing of the SRC 416 or SEQ 414 of a node. Obfuscation does not enforce that inputs to the encryption function are unique.

Obfuscation does not protect the privacy key 136 from compromise. However, the privacy key 136 may be derived using a key derivation function from the network key 134 to protect the network key 134 even if the privacy key 136 is compromised.

Figure 5:
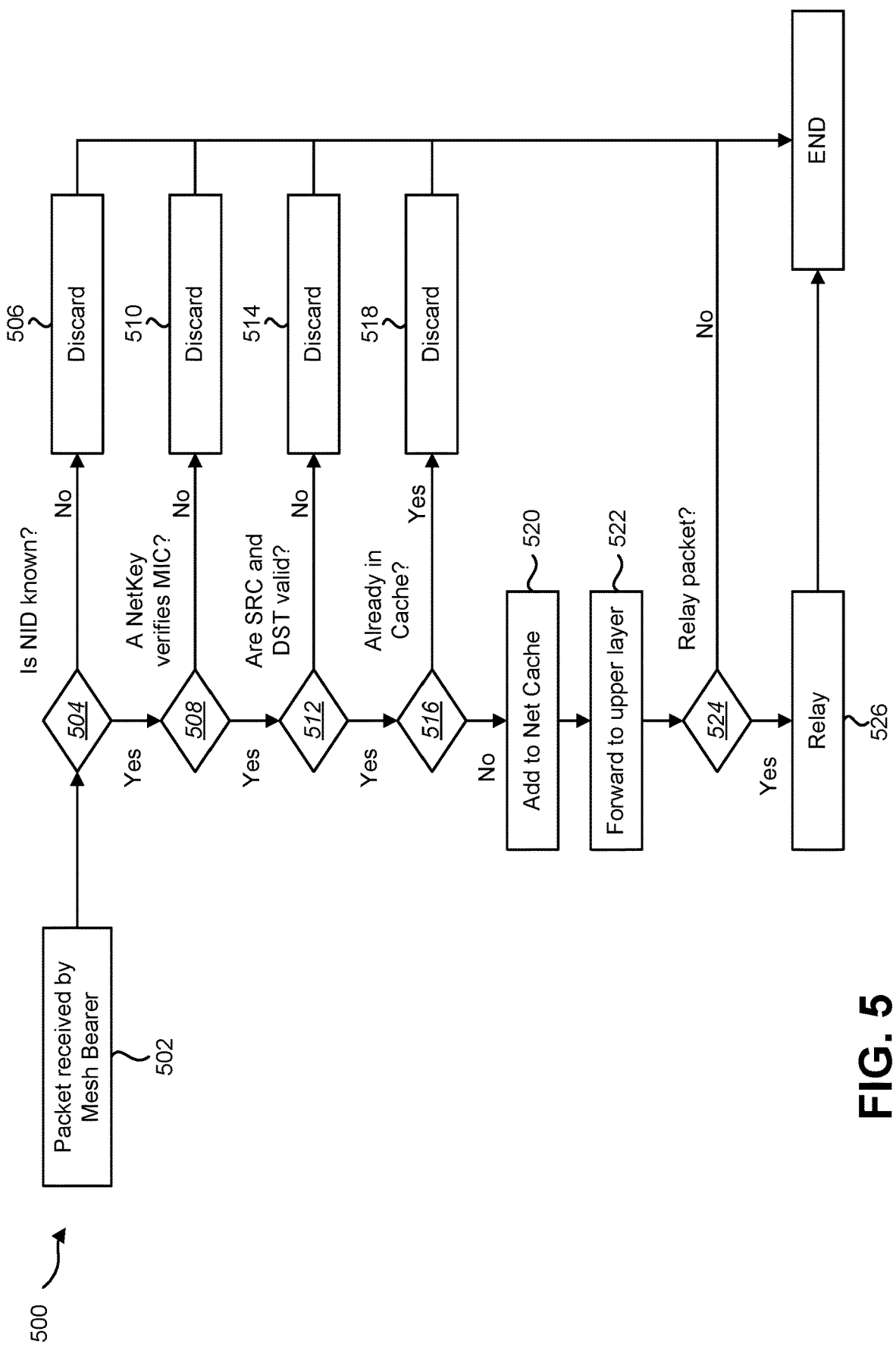
FIG. 5 is a flow diagram illustrating a method for network layer message processing according to Bluetooth mesh specifications.

FIG. 5 is a flow diagram illustrating a method 500 for network layer message processing according to Bluetooth mesh specifications. The mesh device 102 may receive 502 a packet 106. The receiving mesh device 102 may be referred to as a mesh bearer.

The mesh device 102 determines 504 whether the NID 108 is known. Upon receiving a packet 106, the mesh device 102 checks if the value of the NID field 108 value matches one or more known (e.g., configured or provisioned) NIDs 108. If the NID 108 field 108 value does not match a known NID 108, then the packet 106 is discarded 506.

If the NID 108 is known, then the mesh device 102 may authenticate 508 the packet 106 using a network key 134 (NetKey) to verify a message integrity check (MIC). In this step, the mesh device 102 must de-obfuscate the SEQ 114 and SRC address 116 using a privacy key 136 and decrypt the DST 120 and payload 122 using an encryption key 138. Once the packet 106 is de-obfuscated and decrypted, the mesh device 102 may authenticate 508 the packet 106 using a network key 134. If the network key 134 does not authenticate 508 the packet 106, the packet 106 is discarded 510. It should be noted that this step requires the mesh device 102 to decrypt the packet 106 before authenticating 508 the packet 106.

If the network key 134 authenticates 508 the packet 106, then the mesh device 102 may determine 512 whether the SRC address 116 and DST 120 are valid. If the SRC address 116 or DST 120 is invalid, then the packet 106 is discarded 514.

If the SRC address 116 and DST 120 are valid, then the mesh device 102 may determine 516 whether the packet 106 is already in the network message cache 130. If the packet 106 is already in the network message cache 130, then the packet 106 is discarded 518.

If the packet 106 is not in the network message cache 130, then the mesh device 102 may add 520 the packet 106 to the network message cache 130. The mesh device 102 may forward 522 the packet 106 of an upper layer 132 for further processing.

The mesh device 102 may determine 524 whether to relay the packet 106. For example, if the DST 120 indicates that the mesh device 102 is the intended recipient of the packet 106, then the mesh device 102 does not relay the packet 106. If the DST 120 indicates that the mesh device 102 is not the intended recipient of the packet 106, then the mesh device 102 may relay 526 the packet 106.

Figure 6:
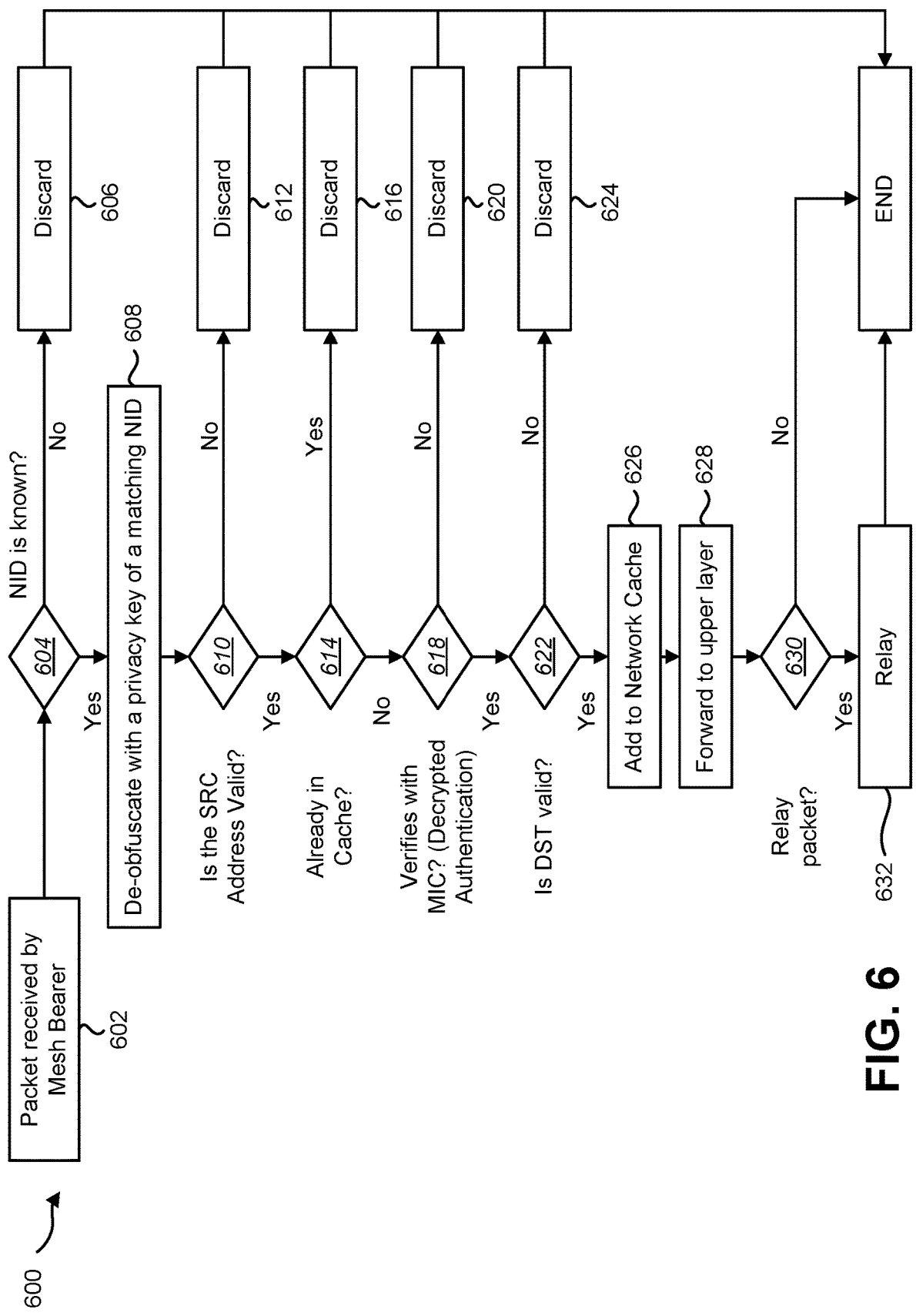
FIG. 6 is a flow diagram illustrating a method for optimized network layer message processing.

FIG. 6 is a flow diagram illustrating a method 600 for optimized network layer message processing. The mesh device 102 may receive 602 a packet 106. The receiving mesh device 102 may be referred to as a mesh bearer.

The mesh device 102 may determine 604 whether the NID 108 is known. This may be accomplished as described in connection with FIG. 6. If the NID field value does not match a known NID 108, then the packet 106 is discarded 606.

If the NID 108 is known, then the mesh device 102 may de-obfuscate 608 with a privacy key 136 of a matching NID 108. For example, the mesh device 102 may select a known network key 134 that matches the NID 108 of the packet 106. In an implementation, the mesh device 102 may de-obfuscate the first information 110 using AES-ECB with the privacy key 136 associated with the selected network key 134. The first information 110 of the packet 106 may include at least one of a sequence number (SEQ) 114 and/or a source (SRC) address 116.

The mesh device 102 may determine 610 whether the SRC address 116 of the packet 106 is valid. For example, the mesh device 102 may determine 610 that the SRC address 116 is valid by determining that the SRC address 116 is not an unassigned, group or virtual address. The mesh device 102 may also determine that the SRC address 116 is valid by determining that the SRC address 116 does not belong to the mesh device 102 (e.g., the packet 106 was not relayed back to the mesh device 102). After using all known network keys 134 that match the NID 108 of the packet 106, if the SRC address 116 is invalid, then the packet 106 is discarded 612 without decrypting the packet 106.

If the SRC address 116 is valid, then the mesh device 102 may determine 614 whether the packet 106 is already in the network message cache 130. For example, if the SEQ 114 and SRC address 116 of the packet 106 are already present in the network message cache 130, then the packet 106 may be discarded 616 without decrypting the second information 118.

If the SEQ 114 and SRC address 116 are not present in the network message cache 130, then the mesh device 102 may verify 618 (i.e., authenticate) the packet 106 with an MIC.

In this step, the mesh device 102 may decrypt the packet 106. For example, the mesh device 102 may decrypt the DST 120 and/or payload 122 of the packet 106 using an encryption key 138 associated with the selected network key 134. The mesh device 102 may then verify 618 the packet 106. If the packet 106 is not verified with MIC, then the packet 106 is discarded 620.

If the packet 106 is verified 618 with MIC, then the mesh device 102 may determine 622 whether the DST 120 is valid. If the DST 120 is invalid (e.g., an unassigned address), then the packet 106 is discarded 624.

If the DST 120 is valid, then the mesh device 102 may add 626 the packet 106 to the network message cache 130. The mesh device 102 may forward 628 the packet 106 of an upper layer 132 for further processing.

The mesh device 102 may determine 630 whether to relay the packet 106. For example, if the DST 120 indicates that the mesh device 102 is the intended recipient of the packet 106, then the mesh device 102 does not relay the packet 106. If the DST 120 indicates that the mesh device 102 is not the intended recipient of the packet 106, then the mesh device 102 may relay 632 the packet 106.

Figure 7:
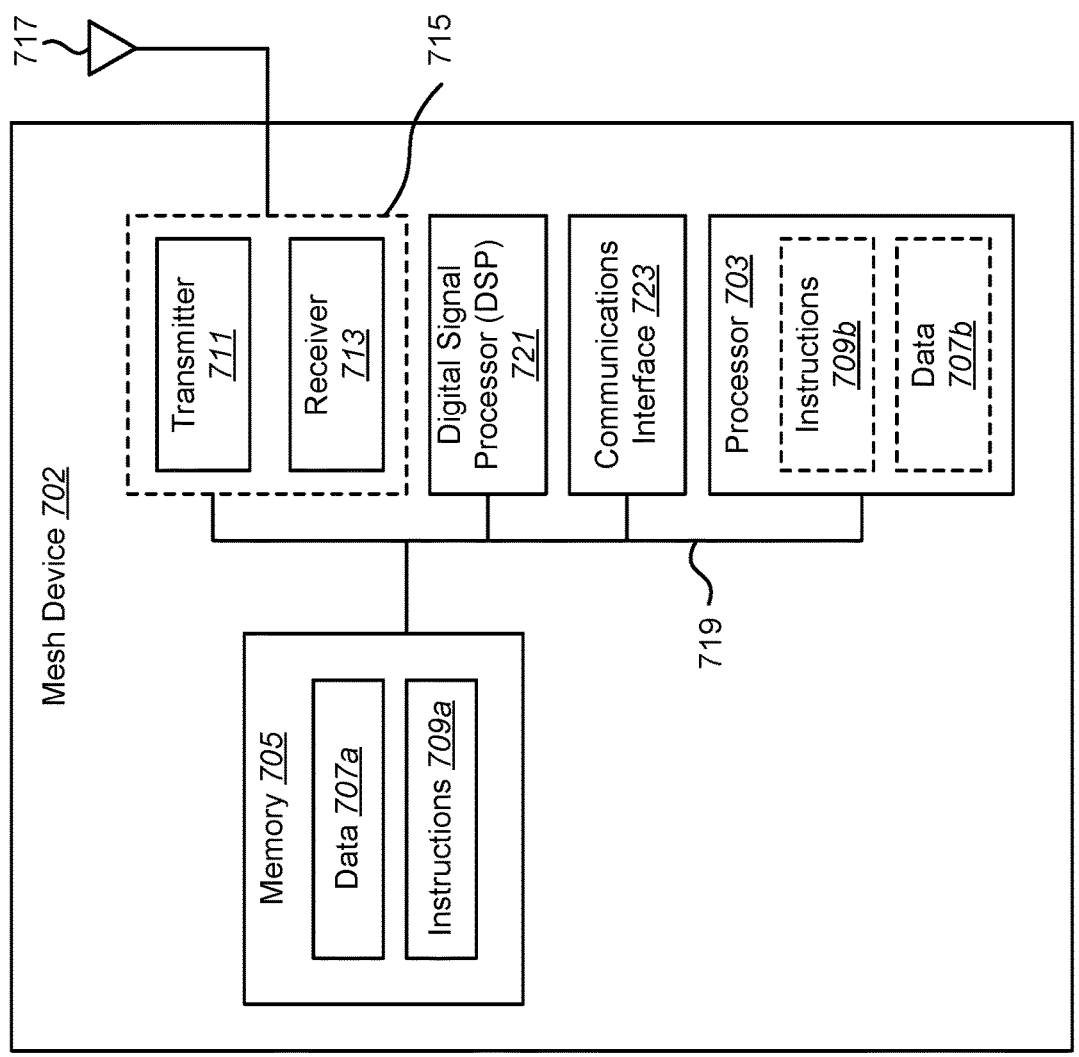
FIG. 7 illustrates certain components that may be included within a mesh device.

FIG. 7 illustrates certain components that may be included within a mesh device 702. The mesh device 702 may be a wireless device, an access terminal, a mobile station, a user equipment (UE), a laptop computer, a desktop computer, a tablet computer, a wireless headset, etc. For example, the mesh device 702 may be a mesh device 102 or a remote mesh device 104 of FIG. 1.

The mesh device 702 includes a processor 703. The processor 703 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 703 may be referred to as a central processing unit (CPU). Although just a single processor 703 is shown in the mesh device 702 of FIG. 7, in an alternative configuration, a combination of processors (e.g., an ARM and DSP) could be used.

The mesh device 702 also includes memory 705 in electronic communication with the processor (i.e., the processor can read information from and/or write information to the memory). The memory 705 may be any electronic component capable of storing electronic information. The memory 705 may be configured as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 707a and instructions 709a may be stored in the memory 705. The instructions may include one or more programs, routines, sub-routines, functions, procedures, code, etc. The instructions may include a single computer-readable statement or many computer-readable statements. The instructions 709a may be executable by the processor 703 to implement the methods disclosed herein. Executing the instructions 709a may involve the use of the data 707a that is stored in the memory 705. When the processor 703 executes the instructions 709, various portions of the instructions 709b may be loaded onto the processor 703, and various pieces of data 707b may be loaded onto the processor 703.

The mesh device 702 may also include a transmitter 711 and a receiver 713 to allow transmission and reception of signals to and from the mesh device 702 via one or more antennas 717. The transmitter 711 and receiver 713 may be collectively referred to as a transceiver 715. The mesh device 702 may also include (not shown) multiple transmitters, multiple antennas, multiple receivers and/or multiple transceivers.

The mesh device 702 may include a digital signal processor (DSP) 721. The mesh device 702 may also include a communications interface 723. The communications interface 723 may allow a user to interact with the mesh device 702.

The various components of the mesh device 702 may be coupled together by one or more buses, which may include a power bus, a control signal bus, a status signal bus, a data bus, etc. For the sake of clarity, the various buses are illustrated in FIG. 7 as a bus system 719.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C.

As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method by a mesh device, comprising:
   de-obfuscating first information of a received packet with a privacy key that matches a network identifier (NID) of the packet;
   determining whether to decrypt second information of the packet based on the de-obfuscated first information;
   wherein determining whether to decrypt the second information comprises:
      determining that a source (SRC) address of the packet is valid; and
   wherein if the SRC address is valid, then determining whether to decrypt the second information further comprises:
      determining whether a sequence number (SEQ) and the SRC address of the packet are already present in a network message cache.

2. The method of claim 1, wherein the packet is a Bluetooth Low Energy mesh packet.

3. The method of claim 1, wherein the first information comprises at least one of a sequence number (SEQ) and/or a source (SRC) address, and wherein the second information comprises destination (DST) information and a payload.

4. The method of claim 1, wherein determining that the SRC address of the packet is valid comprises:
   determining that the SRC address is not an unassigned, group or virtual address.

5. The method of claim 1, wherein determining that the SRC address of the packet is valid comprises:
   determining that the SRC address does not belong to the mesh device.

6. The method of claim 1, wherein if the SRC address is invalid, then the method further comprises:
   determining whether the SRC address of the packet is valid using all known networks with an NID that matches the NID of the packet.

7. The method of claim 1, wherein if the SRC address is invalid, then the packet is discarded without decrypting the second information.

8. The method of claim 1, wherein if the SEQ and SRC address of the packet are already present in the network message cache, then the packet is discarded without decrypting the second information.

9. The method of claim 1, wherein if the SEQ and SRC address of the packet are not present in the network message cache, then the second information is decrypted.

10. A mesh device, comprising:
   a processor;
   a memory in communication with the processor;

instructions stored in the memory, the instructions executable by the processor to:
de-obfuscate first information of a received packet with a privacy key that matches a network identifier (NID) of the packet;
determine whether to decrypt second information of the packet based on the de-obfuscated first information;
wherein the instructions executable to determine whether to decrypt the second information comprise instructions executable to:
determine that a source (SRC) address of the packet is valid: and wherein if the SRC address is valid, then the instructions executable to determine whether to decrypt the second information further comprise instructions executable to:
determine whether a sequence number (SEQ) and the SRC address of the packet are already present in a network message cache.

11. The mesh device of claim 10, wherein if the SRC address is invalid, then the instructions are further executable to:
determine whether the SRC address of the packet is valid using all known networks with an NID that matches the NID of the packet.

12. The mesh device of claim 10, wherein if the SRC address is invalid, then the packet is discarded without decrypting the second information.

13. The mesh device of claim 10, wherein if the SEQ and SRC address of the packet are already present in the network message cache, then the packet is discarded without decrypting the second information.

14. The mesh device of claim 10, wherein if the SEQ and SRC address of the packet are not present in the network message cache, then the second information is decrypted.

15. A non-transitory tangible computer readable medium storing computer executable code, comprising:
code for causing a mesh device to de-obfuscate first information of a received packet with a privacy key that matches a network identifier (NID) of the packet;
code for causing the mesh device to determine whether to decrypt second information of the packet based on the de-obfuscated first information;
wherein the code for causing the mesh device to determine whether to decrypt the second information comprises:
code for causing the mesh device to determine that a source (SRC) address of the packet is valid; and
wherein if the SRC address is valid, then the code for causing the mesh device to determine whether to decrypt the second information further comprises: code for causing the mesh device to determine whether a sequence number (SEQ) and the SRC address of the packet are already present in a network message cache.

16. The computer readable medium of claim 15, wherein if the SRC address is invalid, then the packet is discarded without decrypting the second information.

17. The computer readable medium of claim 15, wherein if the SEQ and SRC address of the packet are already present in the network message cache, then the packet is discarded without decrypting the second information.

18. The computer readable medium of claim 15, wherein if the SEQ and SRC address of the packet are not present in the network message cache, then the second information is decrypted.

19. An apparatus, comprising:
means for de-obfuscating first information of a received packet with a privacy key that matches a network identifier (NID) of the packet;
means for determining whether to decrypt second information of the packet based on the de-obfuscated first information;
wherein the means for determining whether to decrypt the second information comprise:
means for determining that a SRC address of the packet is valid; and
wherein if the SRC address is valid, then the means for determining whether to decrypt the second information further comprise:
means for determining whether a SEQ and the SRC address of the packet are already present in a network message cache.

20. The apparatus of claim 19, wherein if the SRC address is invalid, then the packet is discarded without decrypting the second information.

21. The apparatus of claim 19, wherein if the SEQ and SRC address of the packet are already present in the network message cache, then the packet is discarded without decrypting the second information.

22. The apparatus of claim 19, wherein if the SEQ and SRC address of the packet are not present in the network message cache, then the second information is decrypted.

* * * * *